Patented Sept. 3, 1935

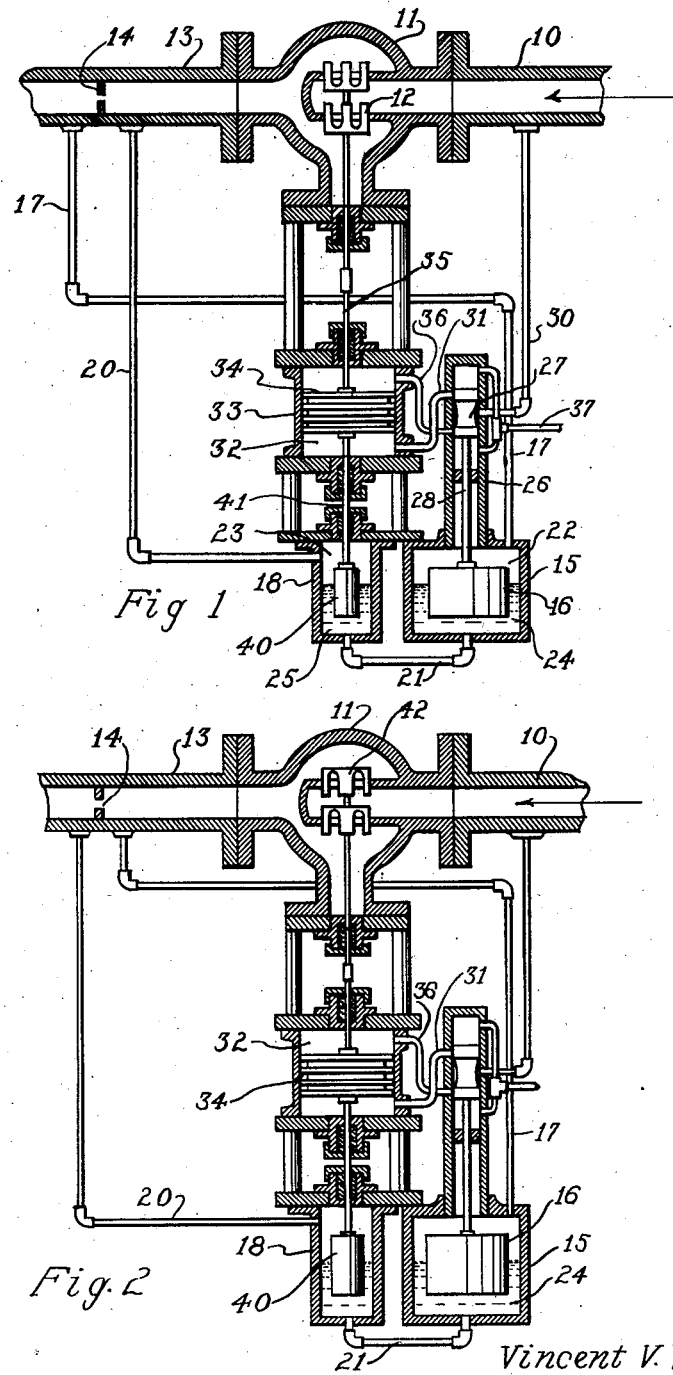

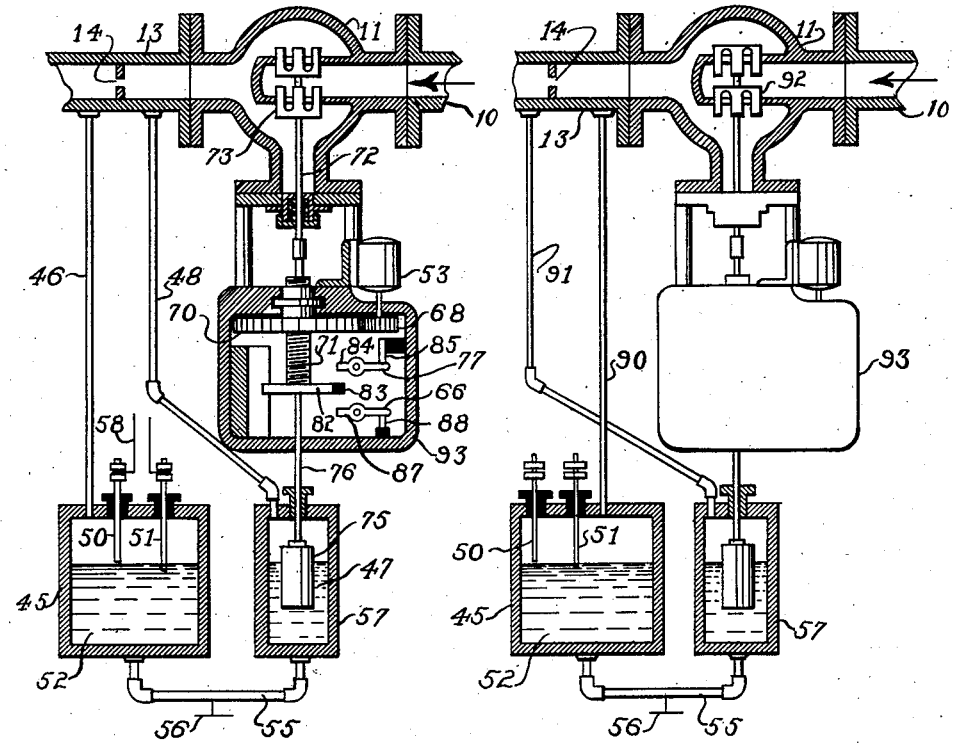
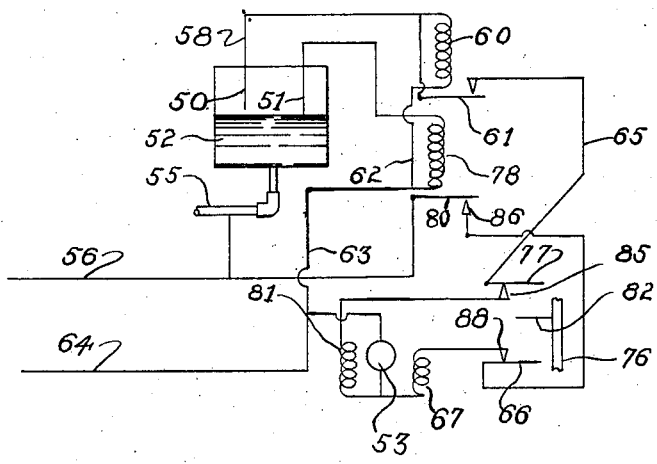
Fig. 3    Fig. 5
Fig 4
INVENTOR.
Vincent V. Veenschoten
BY
ATTORNEY.

2,012,978

UNITED STATES PATENT OFFICE 2,012,978

FLUID FLOW REGULATOR

Vincent V. Veenschoten, Erie, Pa., assignor to Northern Equipment Company, Erie, Pa., a corporation of Pennsylvania Application January 23, 1932, Serial No. 588,313

9 Claims. (Cl. 137—152.5)

This invention relates to fluid flow regulators, and it has for its object providing novel means for regulating the flow of fluids through conduits, particularly by controlling an adjustable orifice through which the fluid flows. Although the invention is applicable to the control of the flow of any fluids, whether gases or liquids, yet it is preferably used to control the flow of liquids, particularly water, through pipes which are controlled by valves. One of the objects of the invention is to vary the opening of the valve so as to provide uniform flow through the transmitting pipe, and this is accomplished by mechanism responsive to variations in pressure in the pipe caused by variations in flow of the liquid therein. A particular object is to provide mechanism responsive to the differences in pressure on the two sides of a restricted orifice in the pipe, preferably adjacent the valve which controls the flow of fluid therethrough.

Of the accompanying drawings, Fig. 1 is an elevation, more or less diagrammatic and mainly in section, of a regulator system which embodies the features of my invention; Figs. 2, 3 and 5 are similar views of modified systems for accomplishing the same purpose; and Fig. 4 is a diagrammatic view of the electric circuits which are applicable to the system of Figs. 3 and 5.

It may be assumed that the water or other fluid is flowing through the pipe 10 in the direction of the arrow, under a suitable pressure which may be uniform or more or less variable. The fluid flows through the valve 11, the ports of which are controlled by means of a plunger 12, then through the pipe 13 in which is provided an orifice 14. The fluid then flows to any desired receiver, such as the boiler of a steam generating system.

The operating mechanism comprises a container 15. This container is connected by means of a pipe 17 with the supply pipe 13. In Fig. 1, this connection is at the far side of the orifice 14. The system comprises also a container 18 which is connected by a pipe 20 with the supply pipe 13 between the orifice and the valve. The lower portions of the two containers are connected by a pipe 21. In the chambers 22 and 23 of the containers is a supply of liquid, preferably mercury 24 and 25, respectively. A float 16 floats on the mercury 24.

When the system is in operation with the fluid flow uniform through the pipe 13, the pressures acting through the pipes 17 and 20, on the mercury surfaces will hold the two masses of mercury in equilibrium with the levels of the mercury 24 somewhat higher than that of the mercury 25. But, in case of an increase in flow of fluid through the pipe 13, owing to the increased pressure of the supply or the decreased pressure in the receiver, or otherwise, the pressure in the pipe 20 will increase with reference to the pressure in the pipe 17, thus forcing downwardly the mercury 25 and forcing upwardly the mercury 24 and elevating the float 16.

Fixed to the container 15 is a tube 26 in which is mounted a pilot valve 27. The valve 27 is connected by means of a rod 28 to the float 16. Connected to the pipe 26 is a pipe 30 which is also connected to the supply pipe 10. As the float rises, the pilot valve 27 is forced upwardly, and the fluid under pressure in the pipe 30 passes into the pipe 31 and into the lower end of the chamber 32 of the cylinder 33. Mounted in the cylinder is a piston 34 which is connected, by means of a stem 35, with the plunger 12 of the valve 11.

Hence, as the flow in the pipe 13 increases, the plunger 12 will be elevated by the increased pressure in the lower end of the chamber 32, closing more the valve. At the same time, the exhaust liquid in the upper end of the chamber 32 is at liberty to pass out through the pipe 36 into the pipe 26 and out to any suitable receiver through the pipe 37. In this manner, the flow of fluid through the pipe 13 is decreased by the closing of the valve 11.

However, it is not desired to completely close the valve 11, as the flow of liquid therethrough would be entirely stopped; and this would be the case if means are not provided for stopping the upward movement of the piston 34. The means which I provide for this purpose comprises a displacement mass 40 mounted in the container 18 and partly submerged in the liquid 25. This mass is connected, by means of a rod 41, with the piston 34. As the piston rises, the mass 40 will be raised, allowing mercury to flow from the container 15 into the container 18 and, thus, lowering the mercury level in the container 15. This will allow the float and the pilot valve 27 to sink, thus closing the inlet to the pipe 31 and the outlet to the pipe 36, and preventing further movement of the piston.

If the mechanism is suitably formed and adjusted, in normal operation, the movement of the plunger 12, by the action of the displacement mass 40, will be sufficient to decrease the flow through the pipe 13 to the desired normal amount, thus maintaining uniform the flow of fluid through the pipe. And this result will follow without reference to the cause of the variation in the flow, and also without reference to whether the abnormal flow is an increase or decrease.

In case of a decrease in flow, the pressure in the pipe 20 with reference to the pipe 17 will decrease, thus allowing the mercury 24 to flow towards the container 18. This will allow the float and the pilot valve to sink and this in turn will allow the fluid pressure to act through the pipe 36 and the upper end of the chamber 32 and, thus, to force downwardly the piston 34. This will lower more the plunger 12 and allow more fluid to flow therethrough. The movement of the piston will lower the mass 40 and this in turn will elevate the mercury 25 and cause a flow back into the container 15 until the pilot valve is in the neutral position and the movement of the plunger is stopped.

It will thus be seen that I have provided means for controlling the flow of fluid through the pipe 13 so as to entirely automatically provide uniform flow therethrough without reference to the cause of the variation in the flow. In case additional fluid is drawn off from the pipe 10, or in case of any leakage in the pipe 10, a decreased pressure therein will follow, the fluid will be forced downwardly somewhat in the container 15, and the plunger will be lowered sufficiently to care for the loss of fluid and, at the same time, to maintain substantially uniform the flow of fluid through the pipe 13.

In Fig. 2, I have illustrated a modification of the system of Fig. 1, in which the container 15 is connected, by means of the pipe 17, between the orifice 14 and the valve 11, while the container 18 is connected by means of the pipe 20 to the far side of the orifice 14. As a consequence of this arrangement, an increased flow will cause an increased pressure in the container 15, and a lowering of the float and the pilot valve. This will cause the pressure fluid in the pipe 30 to act in the upper end of the chamber 32 and force the piston downwardly; thus the plunger 42 will be lowered. The plunger 42 is inverted, however, with reference to the plunger 12, so that the ports of the valve 11 are closed more as the plunger sinks. As a consequence, the lowering of the plunger 42 will close more the valve and decrease the flow through the pipe 13 to compensate for the abnormal flow therein.

At the same time, as the piston 34 is forced downwardly, the displacement mass 40 will be lowered, thus forcing upwardly the mercury 24 in the container 15 and elevating the float and pilot valve so as to close the inlet to the pipe 36 and the outlet to the pipe 31, bringing the plunger to rest. In general, the operation of this system will be similar to the operation of the system of Fig. 1, except for the reversal of the pipes 17 and 20 and the plunger 42.

In Fig. 3, I have illustrated a somewhat similar system, but one in which the hydraulic operating mechanism is replaced by an electric operating mechanism.

In this case, the container 45 is connected by a pipe 46 outside of the orifice 14, and the container 47 is connected by a pipe 48 between the orifice and the valve 11. Mounted on the container 45 are electric contact members 50 and 51. The contact 50 is normally above the surface of the mercury 52, and the contact 51 is normally plunged a slight distance in the mercury. These contacts are connected by circuits, illustrated diagrammatically in Fig. 4, with the motor 53; and the motor is arranged, by suitable operating means, to open or close more the valve 11, as the conditions may require.

In case of an increase in flow through the pipe 13, the increased pressure in the pipe 48 will produce a flow of the mercury 47 from the container 57 through the pipe 55 into the container 45. As a consequence, contact will be made between the mercury 52 and the contact 50. As illustrated in Fig. 4, this will cause a flow of electricity from the supply wire 56 to the pipe 55, the mercury 52, contact 50, wire 58, and coil 60. The current then flows through the wire 62 and 63 out to the source of supply through the wire 64. The coil 60 is arranged as an electromagnet or solenoid, and when excited it will close the switch 61.

The closing of the switch 61 will allow the current to flow from the wire 56, through wire 58, switch 61, wire 65, switch 77, field coil 81, motor 53, to the supply wire 64. This will cause the motor to rotate in the direction to suitably operate the pinion 68 and the gear wheel 70. The gear wheel 70 is threaded onto the screw 71, which is fixed to the stem 72 of the plunger 73. The operation of the motor will thus move upwardly the plunger 73, thus decreasing the flow of fluid.

The displacement mass 75 is also connected with the stem 72 by means of the rod 76 and, as the plunger is moved upwardly, the mass 75 will move upwardly, allowing the mercury 52 to flow towards the container 57, and, thus, breaking the contact between the mercury and the contact 50. This will stop the motor and the movement of the plunger 73. If the adjustments are suitable, the plunger will stop at a position to provide for uniform flow of fluid through the pipe 13.

In case of a decrease in flow of fluid in the pipe 13, the consequent decrease in pressure in the pipe 48 will allow the mercury 52 to flow towards the container 57 and, thus, to break contact with the contact 51. Normally, the electric current flows through the contact 51 from the supply wire 56 through the coil 78, and wire 63 to the return wire 64. The magnetic effect of the coil 78 normally holds the switch 80 open. When the current is broken, the switch 80 will close and the current will flow from the supply wire 56, switches 80 and 66 to the field coil 67, motor 53, and back through the wire 64. This will rotate the motor in the proper direction to lower the plunger and open more the valve 11, thus increasing the flow of liquid through the pipe 13. This in turn, will lower the mass 75 and force mercury back into the container 45 until the contact with 51 is again made.

I prefer to provide also additional means for limiting the movement of the plunger 73. These means comprise the limit switches 66 and 77. Mounted at any suitable position on the mechanism connected with the plunger 73 is an arm 82 having, preferably, an insulation member 83 on its outer end. As the plunger is raised, this member comes in contact with a lever 84 to which is fixed the switch 77, and the switch 77 is thus separated from the contact member 85, which is in turn connected with the field coil 81. This breaks the circuit to the motor and stops the movement of the motor and plunger. Or, if the plunger is being lowered, the member 83 acts on the arm 87 of the switch 66, and opens the switch. As the contact member 88 is connected with the field coil 67 of the motor, this will stop the motor.

In Fig. 5, I illustrate a modification of the system of Fig. 3, in which the container 57 is connected, by means of a pipe 91, with the far side of the orifice 14, and the container 45 is connected by a pipe 90 between the orifice and the valve 11. As a consequence, when the flow through the pipe 13 increases, the mercury 52 will be forced downwardly and contact with the member 51 will be broken. As a consequence, the motor will be set in operation as hereinabove explained, but in a direction to lower the plunger 92 and, thus, close more the valve 11. On the other hand, when the flow in the pipe 13 decreases, the mercury 52 will rise and make contact with the member 50, and the motor will be operated to open further the valve 11.

The plunger 92 is inverted with reference to the plunger 73. Otherwise, the system of Fig. 5 may be similar to the system of Fig. 3, and the diagram of Fig. 4 may be used to illustrate the electric circuits of F.g. 5, it being understood that the connection of the circuits to the motor is such as to rotate the motor in the proper direction for suitably operating the plunger. The limit switches and other mechanism may be enclosed in the casing 93 and may be similar to that shown in the corresponding casing of the system of Fig. 3.

I claim as my invention:

1. Means for regulating the flow of a fluid through a pipe, comprising a valve in said pipe, a first and a second container, said first container being in communication with said pipe at one point, said second container being in communication with said pipe at another spaced point, the lower portions of said containers being in communication with each other, mercury in said containers, means associated with the surface of the mercury in said first container being operatively connected with said valve for varying the opening thereof, and means responsive to the movement of said valve for varying the mercury elevation in the first container.

2. Means as claimed in claim 1, in which the latter means is associated with the mercury surface in one of said containers.

3. Means as claimed in claim 1, in which the latter means is associated with the mercury surface in said second container.

4. Means as claimed in claim 1, in which the latter means comprises a displacement member partly submerged in the mercury in one of said containers and responsive to the movement of said valve.

5. Means as claimed in claim 1, in which the latter means comprises a displacement member partly submerged in the mercury in said second container and responsive to the movement of said valve.

6. Means as claimed in claim 1, in which said means in said first container comprises a float floating on the mercury therein.

7. Means as claimed in claim 1, in which said means in said first container comprises a float floating on the mercury therein, and said responsive means comprises a displacement member partly submerged in the mercury in one of said containers.

8. Means as claimed in claim 1, in which the means in the first container comprises an electric contact adjacent the surface of the mercury therein and a motor operatively associating the valve with said contact.

9. Means as claimed in claim 1, in which the means in the first container comprises an electric contact adjacent the surface of the mercury therein, and the said responsive means comprises a displacement member partly submerged in the mercury in one of said containers.

VINCENT V. VEENSCHOTEN.